L. FLEISCHMANN.
SYNCHRONOUS DYNAMO ELECTRIC MACHINE.
APPLICATION FILED JUNE 5, 1914.
1,172,968.
Patented Feb. 22, 1916.
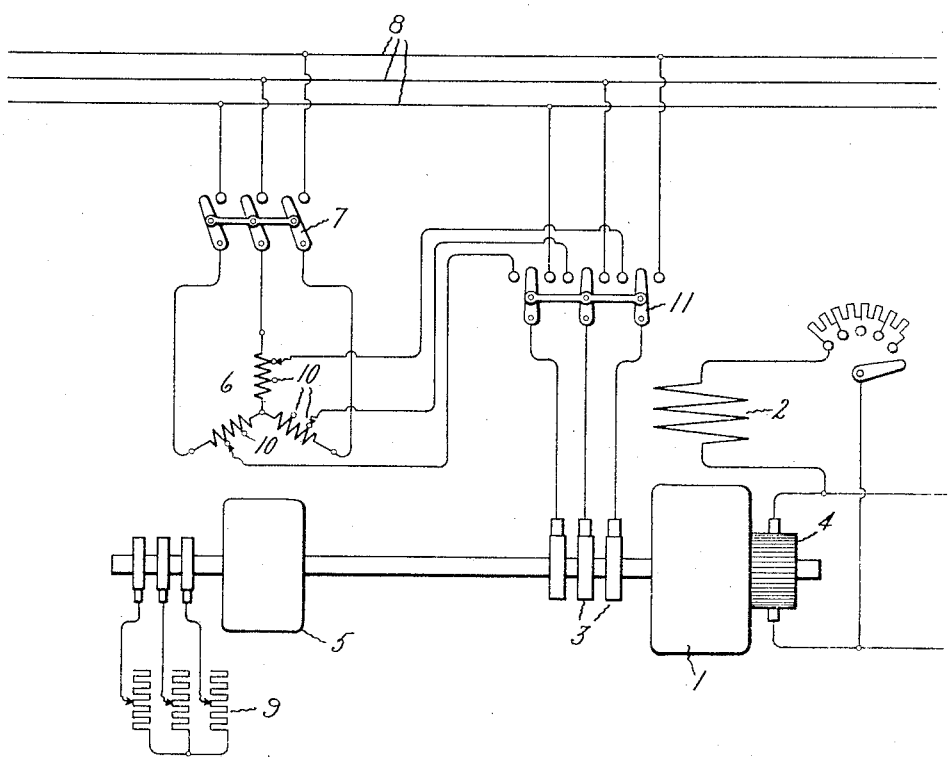
WITNESSES:
INVENTOR:
LIONEL FLEISCHMANN,
BY
HIS ATTORNEY.

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

SYNCHRONOUS DYNAMO-ELECTRIC MACHINE.

1,172,968.  Specification of Letters Patent.  Patented Feb. 22, 1916.

Application filed June 5, 1914. Serial No. 843,219.

*To all whom it may concern:*

Be it known that I, LIONEL FLEISCHMANN, a citizen of the United States, residing at Berlin, Germany, have invented certain new and useful Improvements in Synchronous Dynamo-Electric Machines, of which the following is a specification.

My invention relates to synchronous dynamo electric machines and particularly to the starting of such machines by means of alternating current motors, and has for its object a novel arrangement of apparatus whereby the alternating current voltage applied to the motor and the synchronous machine at starting is independent of the load on the motor or the speed of the motor.

In accordance with my invention, the synchronous machine is started by means of an alternating current motor, the rotatable member of which is mechanically connected to the rotatable member of the synchronous machine, and the primary winding of which is connected to alternating current mains and is provided with taps to which the armature winding of the synchronous machine is connected. It will therefore be seen that the motor not only acts as a motor but also as a compensator. Since the alternating current voltage applied to the primary winding of the motor is distributed uniformly over the winding and is independent of the speed of the motor or the load thereon, the voltage applied to the synchronous machine is always the same when it is connected to the same taps on the primary winding of the motor. By starting a synchronous machine in this way, no disturbance of the voltage of the alternating current mains is caused or is an excessive current drawn therefrom.

For a better understanding of my invention reference may be had to the following description taken in connection with the accompanying drawing in which the single figure is a diagram showing one embodiment of my invention.

My invention is applicable to synchronous machines of any well known type, such as synchronous motors or rotary converters and in the drawing I have chosen to illustrate it in connection with a rotary converter. This converter has an armature 1 and a field winding 2. The armature of the rotary is provided with a winding connected to collector rings 3 and a commutator 4.

An alternating current motor, which I have chosen to illustrate as an induction motor, has its rotatable member 5 mechanically connected to the rotatable member of the rotary converter, which in the drawing is shown as the armature. The motor has a primary winding 6, which may be connected by means of a switch 7 to alternating current mains 8, the winding on the rotatable member 5 being arranged to be short-circuited as on a resistance 9 to start the motor and bring it up to speed. The primary winding 6 of the motor is provided with taps 10 to which the collector rings 3 of the rotary are arranged to be connected. In the arrangement shown a switch 11 connects the collector rings to these taps or to the mains 8.

In starting up the rotary, the induction motor is started in the usual way and the collector rings 3 of the rotary are connected to the taps on the winding 6 of the motor. Since the field structure of the rotary is provided with the usual short-circuited winding, the rotary, as well as the motor, starts as an induction motor, the motor not only acting as a motor but also as a compensator. When the rotary reaches almost synchronous speed, the direct current field winding 2 is connected across the commutator 4 and then the switch 11 is moved so as to connect the collector rings of the rotary to the mains 8. If desired, each phase of the primary winding of the motor may be provided with a plurality of taps, as shown, to which the rotary may be connected, so that the voltage may be applied thereto in steps. By suitable design of the motor, the current flowing into the armature of the rotary during starting can be kept so small that it will have no appreciable demagnetizing effect on the field structure, and the residual magnetism of the rotary will not be killed, so that the rotary can excite itself and come up with the proper polarity.

I have shown the motor and rotary direct-connected, in which case the number of poles of the motor and the rotary are preferably the same. If the motor and rotary are mechanically connected so as to run at different angular speeds, the number of poles of the motor will be preferably equal to the number of poles of the rotary divided by the ratio of the angular speeds. Further, transformers may or may not be introduced between the mains and the motor or rotary as is usual in such systems, and I aim in the appended claims to cover all such modifications, as well as any others which do not depart from the spirit and scope of my invention.

What I claim as new and desire to secure by Letters Patent of the United States, is,—

1. In combination, alternating current mains, a synchronous dynamo electric machine, and means for starting said machine comprising an alternating current motor, the rotatable member of which is mechanically connected to the rotatable member of said synchronous machine, the primary winding of said motor being provided with taps, means for connecting the last mentioned winding to the alternating current mains, and means for connecting the armature winding of said synchronous machine to said taps.

2. In combination, alternating current mains, a rotary converter, means for starting said converter comprising an alternating current motor, the rotatable member of which is mechanically connected to the rotatable member of said converter, the primary winding of said motor being provided with taps, means for connecting the last mentioned winding to the alternating current mains, and means for connecting the armature winding of said converter to said taps.

3. In combination, alternating current mains, a rotary converter, and means for starting said converter comprising an alternating current motor, the rotatable member of which is mechanically connected to the armature of said converter, the primary winding of said motor being provided with taps, means for connecting said last mentioned winding to said alternating current mains, and means for connecting the collector rings of the rotary converter to said taps, whereby said motor operates as a motor and as a compensator.

In witness whereof, I have hereunto set my hand this sixteenth day of May, 1914.

LIONEL FLEISCHMANN.

Witnesses:
RICHARD NEUMANN,
WALTHER REINHARDT.